Patented May 23, 1933

1,910,298

UNITED STATES PATENT OFFICE

FRITZ LAQUER AND HERMANN WEYLAND, OF ELBERFELD, GERMANY, ASSIGNORS TO WINTHROP CHEMICAL COMPANY, INC., OF NEW YORK, N. Y., A CORPORATION OF NEW YORK

HORMONE

No Drawing. Application filed June 25, 1928, Serial No. 288,282, and in Germany August 17, 1927.

The present invention relates to a therapeutically active substance displaying the same physiological activity as the sex hormone found in the anterior lobe of the hypophysis and commonly designated as the "hormone of the anterior lobe of the hypophysis", which hormone is characterized by causing when administered to infantile uncastrated rodents premature rutting phenomena; the invention further relates to a process of preparing the said therapeutically active substance.

In accordance with the present invention a therapeutically active product displaying the efficacy of the physiologically active sex hormone contained in the anterior lobe of the hypophysis is obtainable by treating the urine of pregnant women with water-soluble organic liquids, if necessary after having carried out a non-injurious concentration and purification of the fluid, and then subjecting the crude precipitate obtained by this treatment to further treatment for the purpose of purification and concentration. This process effects simultaneously separation of the active principle displaying the efficacy of the sex hormone of the anterior lobe of the hypophysis from the ovarial hormone accompanying the former in the urine of pregnant women, said ovarial hormone being characterized by its efficacy on the sexual organs even of castrated rodents. In order to obtain simultaneously the ovarial hormone besides the active substance displaying the efficacy of the sex hormone of the anterior lobe of the hypophysis, either the urine to be worked up is submitted (if necessary after careful concentration) to an extraction process with organic liquids immiscible with water prior to being treated with a water-soluble organic liquid or the filtrate remaining, after precipitation with the water soluble organic liquids is extracted with organic liquids immiscible with water, following which extraction in either case the residue remaining after evaporation of the extract and containing the ovarial hormone is subjected to further treatment for the purpose of purification and concentration.

As already indicated, the substance displaying the activity of the sex hormone of the anterior lobe of the hypophysis can be obtained in good yield from the urine of pregnant women. The process is carried out in such a manner that, if necessary after concentration and purification of the starting material under conditions not injurious to the hormone the hormone is precipitated as part of the substance obtained by addition to the starting material of a large excess of alcohol, acetone or a similar water soluble organic liquid; this crude precipitate is then separated and the hormone fraction is subjected to a further purification process. The process has the further advantage that the ovarial hormone, simultaneously present in the starting material can also be obtained. As has been pointed out, the ovarial hormone either remains in the alcoholic filtrate left from the precipitation of the substance displaying the efficacy of the sex hormone of the anterior lobe of the hypophysis, or it can be extracted prior to this precipitation from the starting material by means of organic solvents which are immiscible with water, for example, ether and chloroform. The extracts thus obtained are likewise subjected to a further purification. The hormone preparations thus obtainable are valuable medicinal media, particularly to promote or raise an insufficient function of the ovaries and to cure the illness caused thereby.

The following examples will serve to illustrate our invention, without limiting it thereto:

*Example 1.*—100 litres of the urine of pregnant women which are preserved, advantageously by being kept weakly alkaline, or by the addition of alcohol in an amount of 20 per cent. by volume or of cresol or the like, are concentrated to 10 litres at 40° C. in vacuo and to this concentrated liquid are added five times its quantity of common ethyl alcohol. A crude precipitate and a crude filtrate are obtained which are separated advantageously after standing for several days.

The crude precipitate is dissolved in five times the quantity of water, the solution being kept weakly alkaline, centrifuged from the insoluble matter and the filtrate precipitated with five times the quantity of common ethyl alcohol relative to the crude precipitate. This procedure is repeated, advantageously at least once. The substance displaying the efficacy of the sex hormone of the anterior lobe of the hypophysis remains in the filtrate. By concentrating the latter at 40° C. a more or less yellowish to brownish colored syrup is obtained, which on drying in vacuo over calcium chloride and subsequent grinding with absolute alcohol is converted into a dry powder. The active principle, causing when administered to infantile rodents premature rutting phenomena as is known for the sex hormone of the anterior lobe of the hypophysis, remains unchanged in the dry powder. The active substance is sensitive to heat and dialysable. The dry powder is hygroscopic. The dilute aqueous solution gives no biuret reaction, does not reduce Fehling's solution and is not precipitated with picrolonic acid, tannic acid, mercuric chloride, potassium mercuric iodide, iodine in potassium iodide, uranium acetate or cadmium chloride, but does give a precipitate, for example, with phosphotungstic acid, lead acetate and barium hydroxide.

The crude filtrate is freed from alcohol, further concentrated and mixed with kieselguhr, until a crumbly mass is produced. The ovarial hormone is extracted from the latter with ether. The extract, dissolved in water, is filtered and further purified by prolonged heating with alcohol under a reflux condenser or saponifying with alkalies, after which the hormone is extracted from the saponified solution by means of ether or by precipitating the hormone by precipitants, such as for example, lead acetate and ammonia and extracting the precipitate with alcohol, ether and the like.

The standardizing of the hormone preparation is carried out by experiments on animals.

*Example 2.*—100 litres of the fresh urine of pregnant women are evaporated at 40° C. in vacuo to 10 litres and precipitated with four times the quantity of acetone. A crude precipitate and a crude filtrate are obtained.

The crude precipitate is dissolved in five times the quantity of water, centrifuged from insoluble matter and the filtrate is precipitated with four times the quantity of common alcohol relative to the crude precipitate. The substance displaying the efficacy of the sex hormone of the anterior lobe of the hypophysis remains in the filtrate and can be further purified by fractional precipitation with alcohol, acetone or the like. The product possesses the same properties as that described in Example 1.

The crude filtrate, containing the ovarial hormone is freed from acetone and the remaining liquid is exhaustively extracted with chloroform. The extract, after emulsifying in water and filtering, is further purified by careful treatment with appropriate metallic salts, metallic oxides or hydroxides or metallic colloids, for example, with neutral lead acetate solution or with dialysed ferric hydroxide solution and the excess is removed again by means of hydrogen sulfide.

We claim:

1. In the process for manufacturing a therapeutically active preparation containing a water-soluble sex hormone displaying the physiological activity of the sex hormone of the anterior lobe of the hypophysis which causes premature rutting phenomena when administered to uncastrated infantile rodents, the steps which comprise producing a precipitate by the addition to urine of pregnant women of a large excess of a neutral water-soluble organic solvent and separating the crude precipitate containing the hormone.

2. In the process for manufacturing a therapeutically active preparation containing a water-soluble sex hormone displaying the physiological activity of the sex hormone of the anterior lobe of the hypophysis which causes premature rutting phenomena when administered to uncastrated infantile rodents, the steps which comprise producing a precipitate by the addition to urine of pregnant women of a large excess of a water-soluble organic solvent selected from the group consisting of alcohol and acetone and separating the crude precipitate containing the hormone.

3. In the process for manufacturing a therapeutically active preparation containing a water-soluble sex hormone displaying the physiological activity of the sex hormone of the anterior lobe of the hypophysis which causes premature rutting phenomena when administered to uncastrated infantile rodents, the steps which comprise producing a precipitate by the addition to urine of pregnant women of about five times the quantity of a neutral water-soluble organic solvent and separating the crude precipitate containing the hormone.

4. The process for manufacturing a therapeutically active preparation containing a water-soluble sex hormone displaying the physiological activity of the sex hormone of the anterior lobe of the hypophysis which causes premature rutting phenomena when administered to uncastrated infantile rodents, which process comprises producing a precipitate by the addition to urine of pregnant women of a large excess of a neutral water-soluble organic solvent, separating the crude precipitate containing the hormone and purifying this crude precipitate by fractional re-precipitation with neutral organic liquids miscible with water.

5. The process for manufacturing a therapeutically active preparation containing a water-soluble sex hormone displaying the physiological activity of the sex hormone of the anterior lobe of the hypophysis which causes premature rutting phenomena when administered to uncastrated infantile rodents, which process comprises producing a precipitate by the addition to urine of pregnant women of a large excess of an organic solvent selected from the group consisting of alcohol and acetone, separating the crude precipitate containing the hormone and purifying this crude precipitate by fractional re-precipitation with neutral organic liquids miscible with water.

6. The process for manufacturing a therapeutically active preparation containing a water-soluble sex hormone displaying the physiological activity of the sex hormone of the anterior lobe of the hypophysis which causes premature rutting phenomena when administered to uncastrated infantile rodents, which process comprises concentrating urine of pregnant women in vacuo at a temperature up to 40° C., producing a precipitate by the addition to the concentrated urine of a large excess of a neutral water-soluble organic solvent, separating the crude precipitate containing the hormone and purifying this crude precipitate by fractional re-precipitation with neutral organic liquids miscible with water.

7. The process for manufacturing a therapeutically active preparation containing a water-soluble sex hormone displaying the physiological activity of the sex hormone of the anterior lobe of the hypophysis which causes premature rutting phenomena when administered to uncastrated infantile rodents which process comprises concentrating urine of pregnant women in vacuo at a temperature up to 40° C., producing a precipitate by the addition to the concentrated urine of a large excess of a neutral water-soluble organic solvent selected from the group consisting of alcohol and acetone, separating the crude precipitate containing the hormone and purifying this crude precipitate by fractional re-precipitation by means of alcohol.

8. The process for manufacturing a therapeutically active preparation containing a water-soluble sex hormone displaying the physiological activity of the sex hormone of the anterior lobe of the hypophysis which causes premature rutting phenomena when administered to uncastrated infantile rodents, which process comprises concentrating urine of pregnant women by evaporation in vacuo at about 40° C. up to about one-tenth of its volume, adding to the concentrated urine about five times the quantity of ethyl alcohol, separating the crude precipitate containing the hormone, taking up the crude precipitate in about five times the quantity of water, separating the insoluble matter, precipitating the filtrate with about five times the quantity of ethyl alcohol relative to the quantity of the crude precipitate, repeating this re-precipitation process and drying the active product finally obtained in vacuo.

9. Composition of matter containing a sex hormone displaying the physiological activity of the sex hormone of the anterior lobe of the hypophysis which causes premature rutting phenomena when administered to uncastrated infantile rodents, said composition of matter being obtained from urine of pregnant women, being in the dry state a hygroscopic powder, being soluble in water, being insoluble in undiluted neutral organic solvents, the aqueous solution of which does not reduce Fehling's solution, furnishes a precipitate with phosphotungstic acid, lead acetate and barium hydroxide, but not with tannic acid, the active substance of the powder being sensitive to heat.

In testimony whereof we have hereunto set our hands.
FRITZ LAQUER.
HERMANN WEYLAND.